United States Patent [19]

Herzog et al.

[11] Patent Number: 4,719,644

[45] Date of Patent: Jan. 12, 1988

[54] VIDEO DATA ACQUISITION AND DISPLAY SCAN CONVERTER

[75] Inventors: William F. Herzog, San Martin; William E. Nichols, San Jose, both of Calif.

[73] Assignee: Apert-Herzog Corporation, San Jose, Calif.

[21] Appl. No.: 753,324

[22] Filed: Jul. 9, 1985

[51] Int. Cl.$^4$ .............................................. H04N 5/32
[52] U.S. Cl. ...................................... 378/99; 358/111; 358/140
[58] Field of Search .................... 378/99; 358/111, 140

[56] References Cited

U.S. PATENT DOCUMENTS

| | | | |
|---|---|---|---|
| 3,832,487 | 8/1974 | de Niet ................................ | 358/140 |
| 4,216,499 | 8/1980 | Kunze et al. ........................ | 358/140 |
| 4,442,537 | 4/1984 | Haendle ............................... | 378/99 |
| 4,532,546 | 7/1985 | Aufiero et al. ..................... | 358/111 |

Primary Examiner—Janice A. Howell
Assistant Examiner—David P. Porta
Attorney, Agent, or Firm—David B. Harrison

[57] ABSTRACT

An apparatus and method for acquiring and storing video picture frames at a first rate and for reading and displaying said frames at a second rate which is a selectable integral of the first rate implements the steps of: converting analog picture elements to digital words, storing at least one frame of digital words in a first memory at the first rate, reading the frame of digital words out of the first memory at the first rate in interlaced scan format, storing the frame of digital words read out of the first memory in a second memory at the first rate, reading said frame of digital words out of the second memory at a second rate which is a selectable integral multiple of the first rate, converting the digital words read out of the first memory to analog picture values and putting out said converted analog picture values in interlaced scan format, and converting the digital words read out of the second memory to analog picture values and putting out the converted analog picture values at the second rate.

14 Claims, 6 Drawing Figures

VIDEO DATA ACQUISITION AND DISPLAY SCAN CONVERTER

BACKGROUND OF THE INVENTION

The present invention relates to video signal processing equipment. More particularly, the present invention relates to video data acquisition and display scan conversion apparatus and methods.

Television systems typically acquire picture data at high speed on a picture element (pixel) by pixel basis along a scanning line. Odd numbered lines are scanned as a first field, followed by the scanning of even lines of a second field. Adjacent odd and even fields have their lines "interlaced" in order to remove objectionably perceptible flicker from the display of the television video image. The use of interlaced fields provides for greater resolution in pictures having a high level of dynamic content (i.e. movement).

In some situations, particularly those characterized by low dynamic level, progressive scanning of the picture (i.e. the entire picture is scanned line after line in sequence) will yield greater picture detail in the vertical domain. The problem with the progressive scanning technique is that the flicker rate is one half that present with interlaced scan. With a typical field rate of thirty frames per second, progressive scan of all of the lines of each frame results in a flicker rate which is perceptible by the eye when displayed upon a viewing screen coated with phosphors having a normal persistence (e.g. P4 material). The flicker is subjectively displeasing to the viewer, and makes prolonged viewing difficult.

In the case of a picture image which is presented as the result of impulse illumination, such as an X-ray image excited by an X-ray burst from a pulsed X-ray tube which is displayed on the display screen of an image intensifier, it is known that the first field of an interlaced scan acquires more picture detail (energy) than is acquired by the second field. One explanation offered for this phenomenon is that the scan of the first field discharges adjacent pixels otherwise scanned in the second field. One solution to this problem has been to pulse the X-ray tube at the field rate (60 Hz) so that each field has been illuminated substantially equally. The significant drawback to this solution is that the subject, in many cases a human being undergoing medical imaging procedures, is thereby subjected to twice the amount of radiation.

A hitherto unsolved need has arisen for a video data acquisition and display system which optimizes the conditions for the acquisition of video data, and at the same time optimizes different conditions for the display of such data.

In some medical procedures, such as angioplasty, the physician feeds a cable through an artery into the heart cavity through valves. A radiopaque dye may be released into the bloodstream in the heart in order to locate the artery to which the cable is directed via X-ray imaging. The radiopaque die dissipates very rapidly, and the image outlining the artery system of the heart (called a "roadmap") is quite transitory. In the prior art disk recorder/players have been employed to capture and play back the road map. These machines have been expensive and have not been fully integrated with other related equipment. A hitherto unsolved need has arisen for a solid-state electronic video data acquisition and display system which effectively stores a roadmap image and recalls it for display at any time during the imaging operation.

A further hitherto unsolved need has arisen which enables video data in either progressive or interlace scan format to be converted to a high resolution interlace scan display format having at least 2n the number of original scanning lines, as well as a conventional scan format for storage; so that conventional video recording equipment may be used to store and playback the video data acquired by the system while at the same time enabling display of the video data at a higher resolution scanning rate than the rate employed during data acquisition.

SUMMARY OF THE INVENTION WITH OBJECTS

A general object of the present invention is to provide a video data acquisition and display scan conversion system which optimizes conditions for acquisition of video data and which optimizes different conditions for display of such data in a manner which overcomes limitations and drawbacks of the prior art.

A specific object of the present invention is to provide a video data acquisition system which selectively converts progressive scanning to interlaced scanning and vice versa.

Another object of the present invention is to provide for a video system which acquires video data at a first scanning rate in progressive or interlaced format, and which converts such data to a second scanning rate which is an integral multiple of the first scanning rate for high resolution display.

A further object of the present invention is to provide for a video system which enables video data to be acquired, stored and retrieved in a conventional interlaced scan format recorder and displayed at a different, higher rate.

One more object of the present invention is to provide for a video system which enables multiple frames of video data to be acquired, stored and selectively read and displayed.

A television digital data acquisition and display scan converter includes an analog television camera for scanning frames of pictorial images at a first predetermined scanning rate. An analog picture display enables the pictorial images to be displayed at a second, higher scanning rate. The converter includes an analog to digital converter connected to receive an analog data stream from the camera. The analog to digital converter converts scanned lines of analog picture values into digital words. A frame memory is connected to the analog to digital converter, and it stores the digitized picture words comprising at least one frame of video information scanned by the camera. A frame memory control is connected to the frame memory, and it controls the locations at which the digital data corresponding to picture values are written in the frame memory and it controls readout of the words in scan format at the higher scanning rate. A digital to analog converter is connected to an output of the frame memory and to an input of the analog picture display; and it converts the digital words read from the frame memory into analog video in interlaced picture frame format at the higher scanning rate for display on the analog picture display. A synchronizer is connected to the camera and to the frame memory control. The synchronizer synchronizes camera scan rates and memory operations and provides suitable synchronizing pulses to the analog video lines put out by the digital to analog converter.

In one specific aspect of the television digital data acquisition and scan converter the pictorial images are produced by pulsating energy excitation and are scanned by the camera means progressively. In this aspect the synchronizer controls the timing of the excitation energy pulses.

In another aspect the television digital data acquisition and display scan converter includes scan selection means enabling the frame memory control to select between progressive and interlaced scanning of input video at the scan rate of the camera.

In a further aspect the television digital data acquisition and display scan converter uses a conventional video recorder to store the pictorial images and provides an interlaced video input for enabling interlaced video input at standard scan rate from the video recorder.

In a further aspect the television digital data acquisition and display scan converter provides a selectable plurality of analog outputs including an interlaced video output at standard scan rate for input to a conventional video recorder means and an interlaced video output at a scan rate being approximately an integral multiple of the first predetermined data acquisition scanning rate.

In another aspect the television digital data acquisition and display scan converter derives its pictorial image in response to excitation provided by a pulsed X-ray tube the pulsing of which is timed by the synchronizer. In this aspect, the camera senses a pictorial image generated upon a screen of an image intensifier presented in response to the pulsed X-ray excitation from the X-ray tube.

The method of the present invention is for acquiring and storing video picture frames at a first rate and for reading and displaying the stored frames at a second rate faster than the first rate. The method includes the steps of:

converting analog picture elements to digital words,
storing at least one frame of digital words in a memory at the first rate,
reading the frame of digital words from the memory at the second rate,
converting the digital words to analog picture values,
displaying the values on an analog display device at the second rate.

These and other objects, advantages and features of the present invention will be better understood and appreciated by consideration of the following detailed description of a preferred embodiment, presented in conjunction with the accompanying drawing.

DETAILED DESCRIPTION OF A PREFERRED EMBODIMENT X-RAY IMAGING SYSTEM 10

Figure 1:
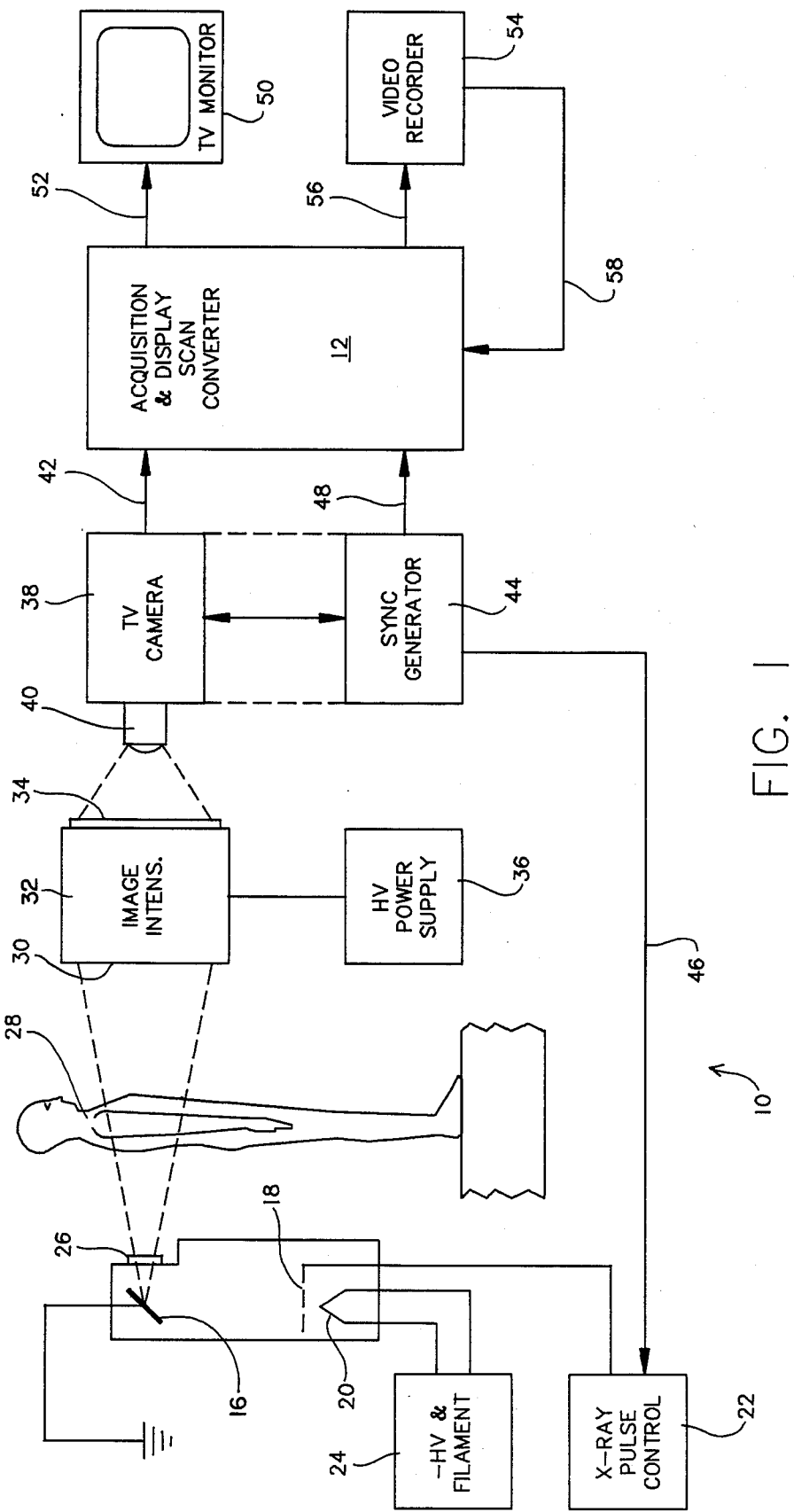
FIG. 1 is an overall block diagram of an environment of a pulsed X-ray imaging system including a data acquisition and display scan converter according to the present invention.
Figure 4:
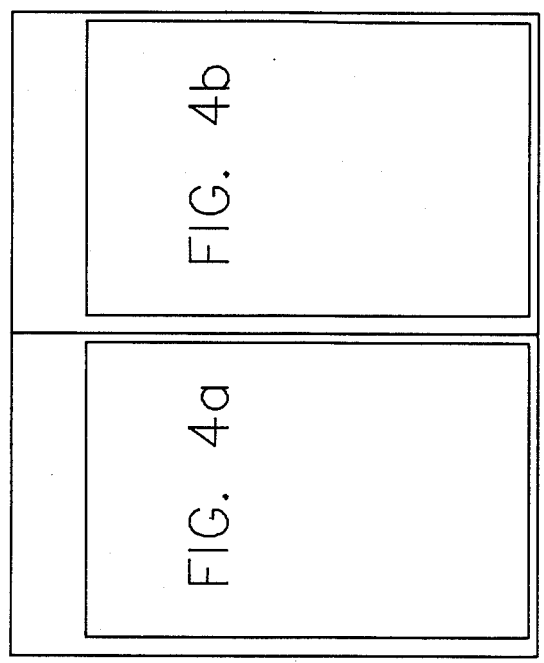
FIG. 4 is a layout plan for FIGS. 4A and 4B.

A pulsed X-ray imaging system 10 incorporating a data acquisition and display scan converter 12 in accordance with the present invention is depicted diagrammatically in FIG. 1. Therein, the imaging system includes an X-ray tube 14 which includes a grounded X-ray producing anode 16, a grid 18 for controlling beam emission from a direct filament cathode 20. A grid pulse control circuit 22 provides pulsed grid potential to the grid 18 thereby to control beam emission and X-ray output. A conventional heater and minus high voltage supply 24 provides the direct filament cathode 20 with suitable energy and also establishes the requisite potential difference between the anode 16 and the cathode 20 so that the electron beam striking the anode 16 has sufficient energy to cause generation of X-ray energy.

Pulsed X-ray energy is emitted through a window 26 of the tube 14, through an object or subject to be imaged by X-radiation, such as a person 28, and ultimately impinges upon an X-ray photosensitive surface 30 of a photomultiplier device 32. The photomultiplier device 32 converts the X-radiation into electron flow which is multiplied by avalanche effect through the photomultiplier 32. A phosphorescent display screen 34 converts the multiplied electrons impinging thereon into visible light. A suitable power supply 36 supplies the energy needed to operate the photomultiplier 32 in conventional manner.

The X-rays passing through the subject 28 are selectively absorbed by internal organs, with the result that the X-ray beam emerging from the subject forms an image of internal organs of the subject, such as the heart, on the surface 30 of the photomultiplier 32. The visible light display on the display screen 34 of the photomultiplier 32 also constitutes an image of the subject's internal organs. An X-ray opaque dye may be introduced into the organ being examined. The dye absorbs substantially all of the X-radiation and sharpens the image of the organ undergoing X-ray fluoroscopy.

A television camera 38 includes a lens 40 for focusing the image formed on the display screen 34 upon a photosensitive surface within the camera 38. The photosensitive surface of the camera 38 may be swept either progressively (sequentially) or interlaced. The camera 38 puts out a standard number of scanned lines of video, such as 525 lines, whether in progressive or interlaced format, to an input line 42 of the acquisition and display scan converter 12.

A synchronization pulse generator 44 generates the electrical signals needed to operate the camera 32, including horizontal sweep and beam retrace interval pulses and vertical beam retrace interval pulses. It also generates a pulse control signal which is supplied on a line 46 to the X-ray pulse control circuit 22 for causing the X-ray burst to be timed to occur preferably during the vertical beam retrace interval.

The sync pulse generator 44 also supplies timing information on a line 48 to the acquisition and display scan converter 12. A display monitor 50 receives video on a line 52 from the acquisition and display scan converter 12. A conventional video recorder 54 has an input connected to a line 56 of the acquisition and display scan converter 12 and has an output for feeding recorded video in standard format back into converter 12 via a line 58.

DATA ACQUISITION

Figure 2:
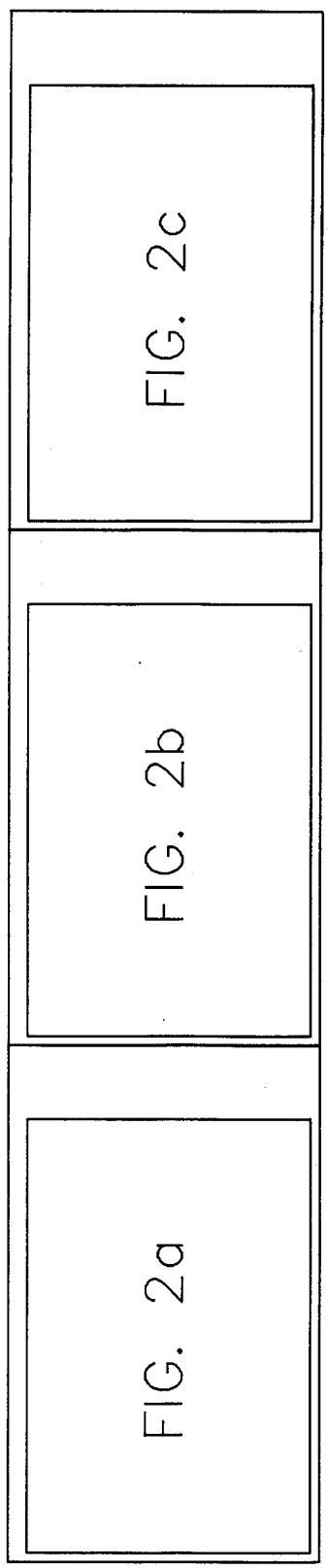
FIG. 2 is a layout plan for FIGS. 2A, 2B, and 2C.
Figure 2A:
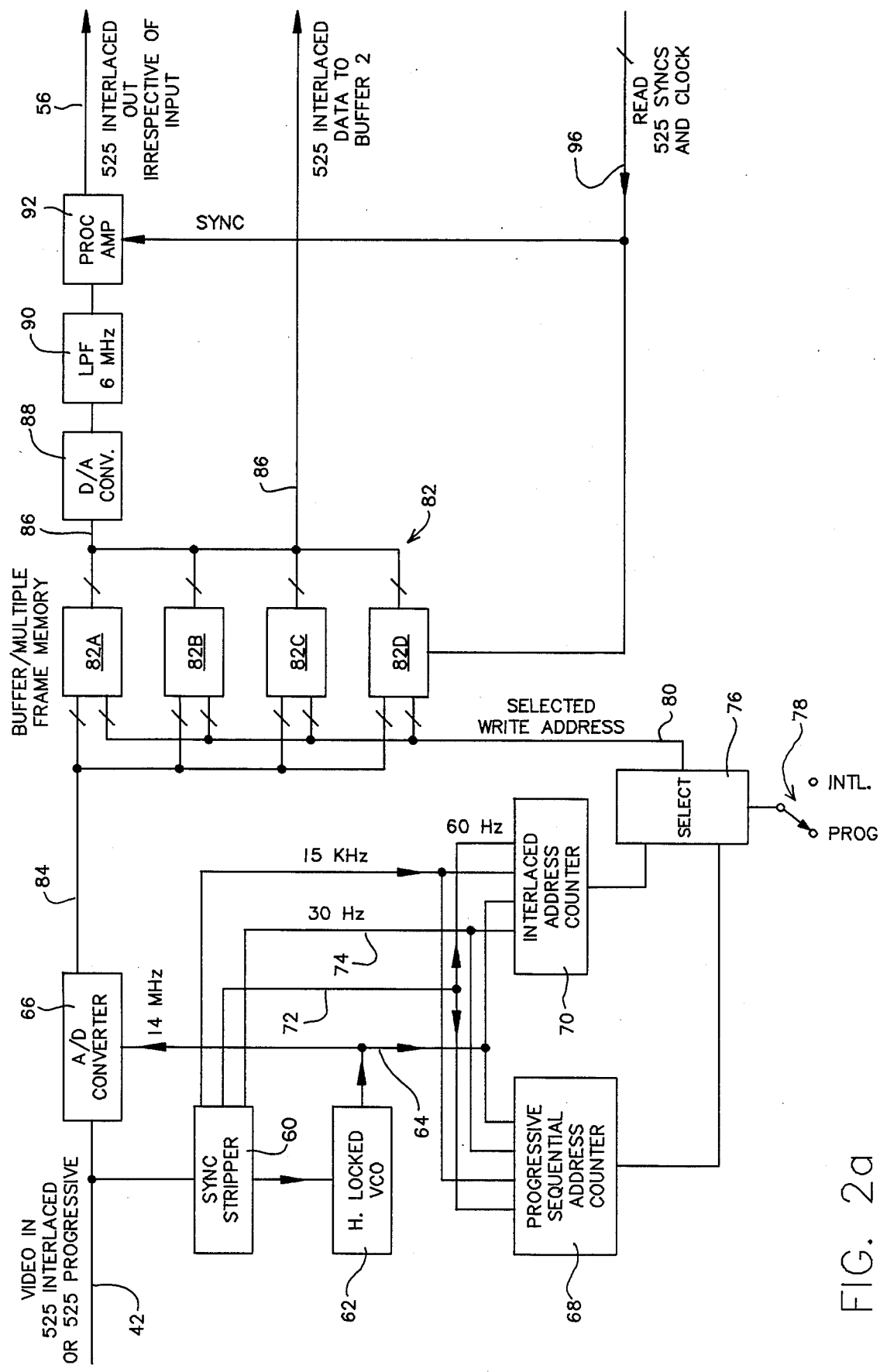
FIGS. 2A, 2B and 2C, when arranged together as shown in FIG. 2, provide a detailed block diagram of the data acquisition and display scan converter of the present invention, shown in one preferred embodiment in FIG. 1.

As shown in FIG. 2A, video enters the acquisition and display scan converter 12 on the line 42. The video is either in 525 line interlaced or progressive scan format. A sync stripper 60 removes synchronizing pulse information from the analog video data stream. A horizontal scan locked voltage controlled oscillator 62 generates a 14 MHz quantizing clock logic signal which is synchronized to the horizontal scan rate. the quantizing clock signal is put out on a line 64 which extends to an analog to digital converter 66, a progressive scan address counter 68 and an interlaced scan address counter 70. The sync stripper supplies a 60 Hz field rate clock logic signal to the counters 68 and 70 over a line 72; and it supplies a 30 Hz frame rate clock logic signal to the counters 68 and 70 over a line 74. The sync stripper also supplies a 15 KHz line rate clock logic signal to the counters 68 and 70 over a line 75. A selection circuit 76 responsive to a switch 78 enables either the progressive counter 68 or the interlace counter 70 to generate and put out memory addresses on a line 80 in order to control addressing of a data acquisition buffer memory array 82 to which the line 80 extends.

As shown in FIG. 2A, there are four identical memory blocks 82A, 82B, 82C and 82D which are connected to form the single addressable data acquisition buffer memory array 82. Each of the blocks 82 is sized to store a frame of quantized (digitized) video picture elements. The blocks 82A-D are parallel connected to receive a digital output from the analog to digital converter 66 on a line 84; and an output from the blocks 82 is available on a line 86.

The digital video picture values read out of the memory blocks 82A, 82B, 82C and 82D on the line 86 are converted back into analog picture values by a digital to analog converter 88. A low pass filter 90 removes any artifacts of the digitization process above e.g. 6 MHz. And, a processing amplifier 92 adds composite horizontal and vertical sync pulses back to the video. The processing amplifier provides analog interlaced composite video at the standard rate, e.g. 525 lines/frame on the converter output line 56, leading for example to the input of the video recorder 54 (FIG. 1). A bus 96 supplies interlaced scan read addresses to the memory blocks 82A, 82B, 82C and 82D, and composite sync pulses to the processing amplifier 92.

SCAN CONVERSION

Figure 2B:
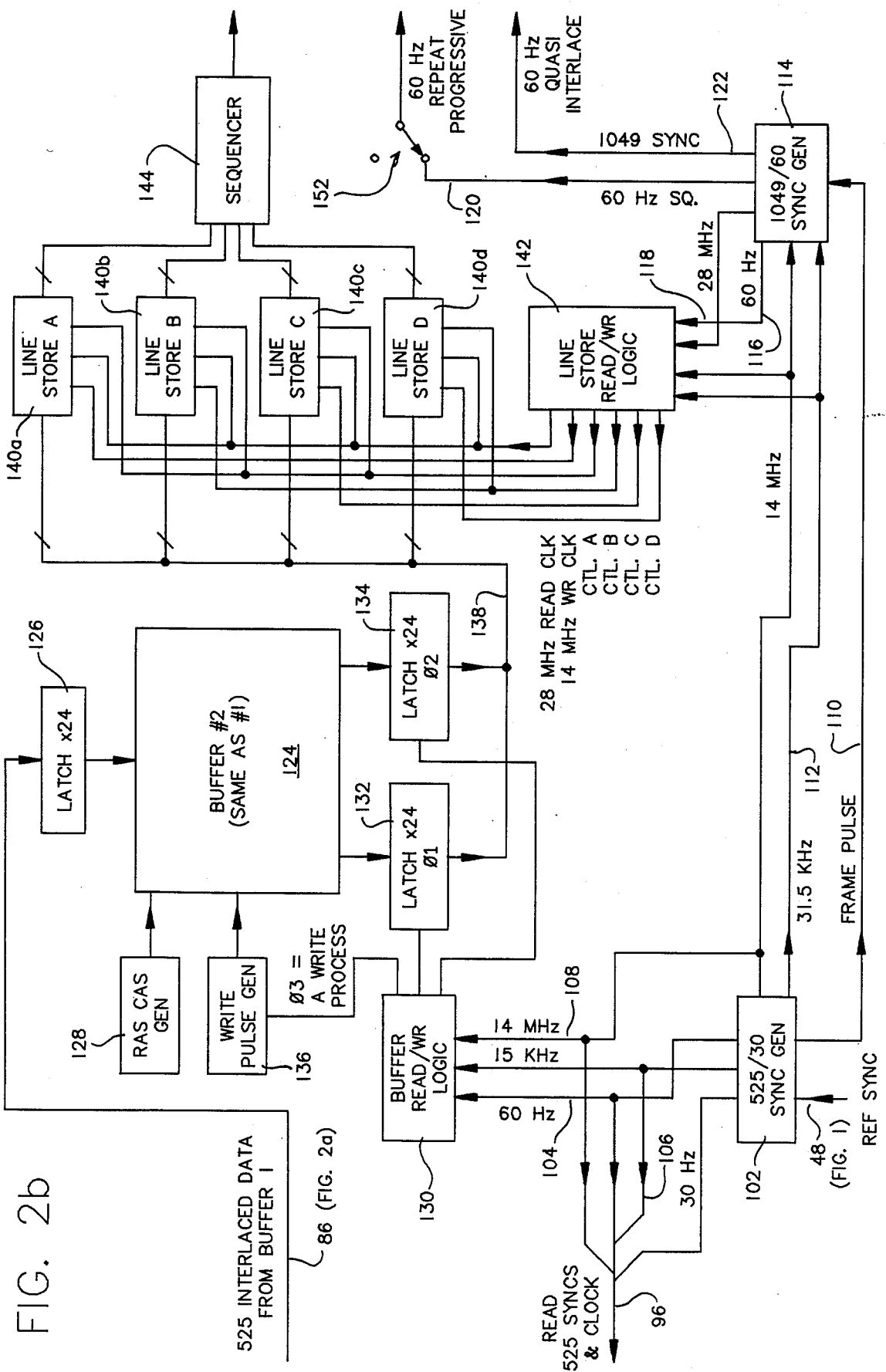
Figure 2C:
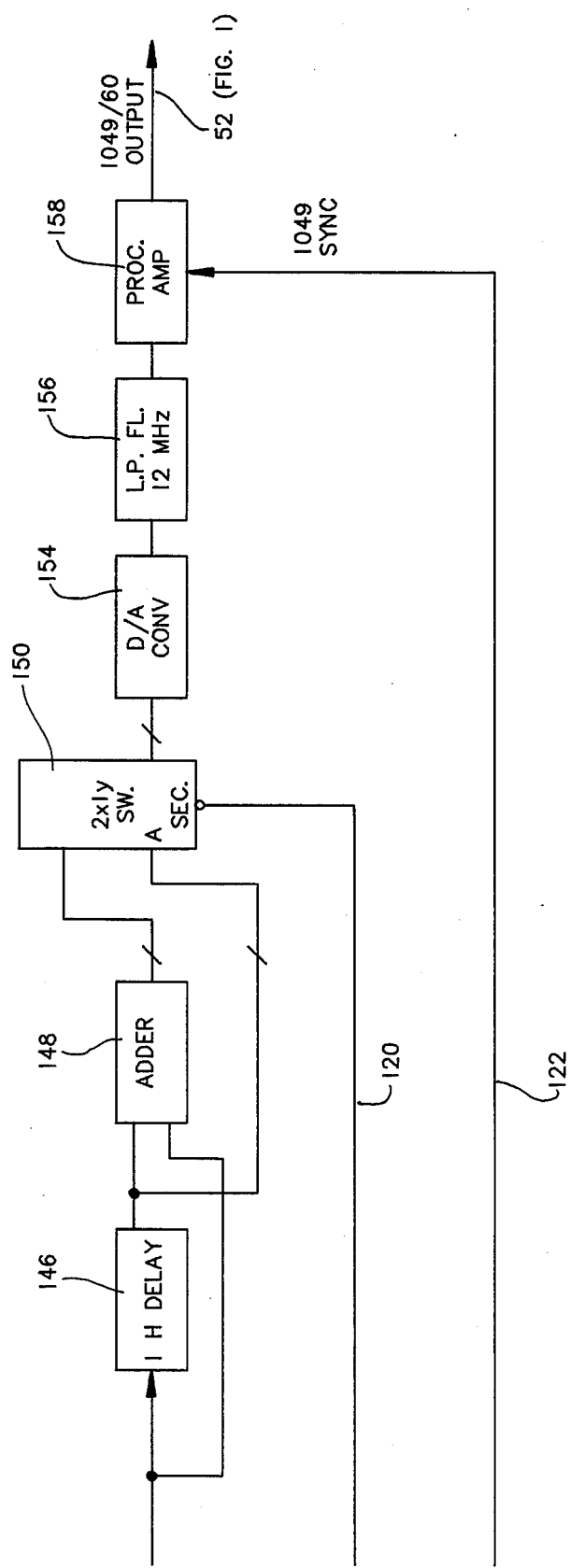

The display scan conversion operations of the acquisition and display scan converter 12 are carried out by the circuit elements depicted in FIGS. 2B and 2C. Therein, reference sync from the sync generator 44 on the line 48 enters a first internal sync generator 102 which generates digital reference timing pulse streams for e.g. 525 lines per frame and 30 frames per second video signals. Thus, the generator 102 puts out a 60 Hz field clock on a line 104, a 30 Hz frame clock on a line 105, a 15 KHz line clock on a line 106, and a 14 MHz readout clock on a line 108.

The 14 MHz quantizing clock on the line 108, a frame pulse clock on a line 110, and a 31.5 KHz clock are sent to a second internal sync generator 114 which is thereby synchronized with the operation of the first sync generator 102. The second generator 114 effectively doubles the line scan rate from 525 to 1049 (an odd number of lines per frame is required to bring about interlace of the lines, hence 1049 lines rather than 1050). In order to generate twice the number of lines, the second generator 114 generates and puts out a 60 Hz frame clock on a line 116, a 28 MHz readout clock on a line 118, a 60 Hz square wave interlace control clock on a line 120, and 1049 line composite sync on a line 122. These clocks and their uses will be explained in greater detail hereinafter.

Interlaced, digitized picture data from the first buffer memory 82 enters a scan conversion buffer memory 124 synchronously over the line 86 (from FIG. 2A). It is important to note that the scan conversion buffer memory 124 operates synchronously with the incoming data stream, and there is no need for arbitration of read/write timing.

A latch 126 latches the data on the line 86 and properly times its entry into the buffer memory 124. A memory refresh circuit 128 is provided for refreshing the memory 124 (since dynamic random access memory chips are employed; a fast static memory array would not require memory cell refresh).

A buffer logic block 130 receives clocks on the lines 104, 106 and 108 and generates read (Phi 1 and Phi 2) and write (Phi 3) control pulses. The Phi 1 and Phi 2 read control pulses are sent respectively to control two output latches 132 and 134 connected to receive the data put out from the second buffer memory 124. The Phi 3 write control clock is connected to a write pulse generator 136 which generates properly timed write pulses for writing data into the scan conversion buffer memory 124.

Data from the latches 132, 134 is sent via a line 138 to four line buffers 140A, 140B, 140C and 140D. The line buffers are sequentially loaded and unloaded in accordance with timing signals generated by a line store read/write control circuit 142 which generates the control signals from the clocks on the lines 108, 112, 116 and 118.

A digital sequencer 144 assembles lines of digitized video selectively read from the line stores 140A-D into a serial data stream. Referring now to FIG. 2C, a delay line 146 delays the data put out from the sequencer 144 by a one line delay (1 H) period. An adder circuit 148 digitally combines an underlayed line of video with a delayed video line in order to generate and put out a video scan line which is the average of picture values for the two video scan lines being combined. An electronic selector 150, controlled by operation of a switch 152, enables an average scan line to be put out every other scan line, enabling a "quasiinterlace" of lines at twice the original frame rate. This mode minimizes flicker while maximizing resolution in the vertical dimension. When the switch 152 is open, the adder 148 is removed, and the digital video comprises e.g. 1049 lines in progressive scan format.

A digital to analog converter 154 converts the digital picture values to analog values. A low pass filter 156 filters the analog video at the e.g. 1049 line scan rate (rolloff at 12 MHz) to remove unwanted high frequency artifacts from the digitization process. A second processing amplifier 158, connected via the line 122 to the second internal sync generator 114, restores composite horizontal and vertical synchronizing pulses to the analog picture data stream, which is put out on the converter output line 52 to the monitor 50 (FIG. 1).

BUFFER MEMORY (FIG. 3)

Figure 3:
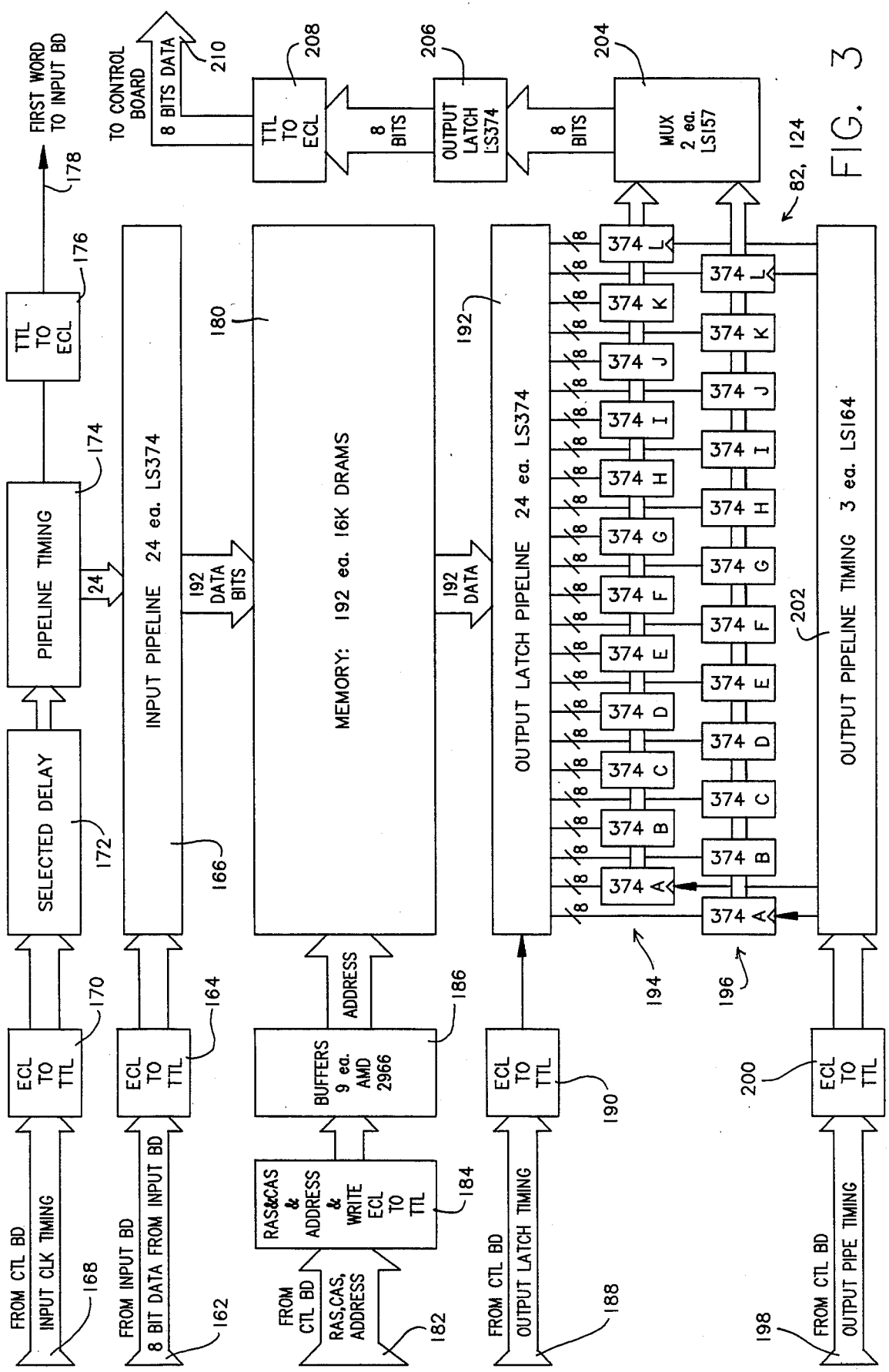
FIG. 3 is a block diagram of a frame memory portion of the data acquisition and display scan converter of the present invention.

A representative buffer memory is shown in FIG. 3. This buffer memory may be used as the data acquisition memory 82 and also as the scan conversion memory 124. Thus, except as specifically noted, the explanation of this memory will be applicable to both memories 82 and 124.

Digitized picture data (e.g. eight bit data words) at the quantization rate (e.g. 14 MHz) enters the memory on a line 162. An ECL to TTL converter/driver 164 converts the data to TTL logic levels. The data is then serially loaded into an array 166 of e.g. 24 octal tri state latches (192 bits total), such as type 74LS374 with their inputs tied together. The converter 164 provides sufficient driving power to drive all of the latches of the array 166. The latch array 166 functions as a serial to parallel converter and parallelizes the data words.

The quantization clock comes into the memory on a line 168. The level is converted to TTL from ECL by a converter 170, is delayed suitably in a delay 172, and then operates a pipeline timing generator 174. The generator 174 successively loads each of the latches making up the array 166. Once the latches are completely full the timing generator 174 generates a first word signal which is converted to ECL by a TTL to ECL converter 176 and put out to the write control circuitry and the data is written into the memory array 180 as a parallel operation.

The first word signal enables insertion of useful information into the first pixel storage location. This location is normally covered by the standard blanking interval pulse. In one application for the broadcast equipment environment, the first word is useful for foolproof color framing within the digital memory system. In the within medical application, the first pixel storage location is useful to store a "Field 1" or "Field 2" identification value received from slow motion or pause video recording and playback equipment. In order to use the information stored in the first pixel location it is necessary to remove the blanking pulse at that location. This first word storage provides a foolproof mechanism for identifying fields of an interlaced picture. It may be carried out with video recording equipment so long as such equipment is capable of being controlled by the present system.

After the data is written into the memory array 180 as a parallel operation, the latches of the array 166 are then reloaded serially and unloaded in parallel into the memory. This process continues in pipeline fashion during the operation of the converter 12. It is important to note that the use of a wide data word permits the memory array to be read during the time that the data word is being assembled in the latch array 166.

Address information enters the memory array via a line 182 and it is converted from ECL to TTL levels by a converter/driver 184. This addressing information for read/write and refresh is converted from high to low impedance in a buffer array 186 and applied to the memory 180 with sufficient drive capability (signal strength) in order to write data into the memory 180 and read data from it.

With a 14 MHz data rate, each clock cycle is 70 nanoseconds. It takes 1.68 microseconds to load the array 166 for each write to memory operation. With memory chips nominally operating at a 400 nanosecond clock rate, it is possible to read the memory array three times during each interval between each write operation. The write operation itself requires approximately 400 nanoseconds in order to carry out write set up including RAS, CAS and write address.

An output latch timing signal enters the memory on a line 188 and its logic level is converted from ECL to TTL by a converter/driver 190. The timing signal put out by the converter/driver 190 controls operation of a parallel data latch 192 which holds 24*8 (192) bits of data read from the array 180 during each read cycle. The data held in the latch 192 is loaded in parallel into two sets of latches, a first set 194 and a second set 196. These latch sets 194 and 196 store 192 bits of data and are divided into a pair so that the output signal driving capability of each set is not exceeded. An output pipeline timing signal enters the memory on a line 198, is converted from ECL to TTL level by a converter/driver 200 and is used to clock an output pipeline timing circuit 202 which sequentially unloads each latch of the sets 194, 196 in parallel. Each cycle of the read operation, e.g. 70 nanoseconds, an eight bit video picture word is unloaded from a latch of the sets 194, 196 and is selected by a multiplexer 204, passed through an output latch 206, converted from TTL to ECL signal levels by a converter/driver 208, and put out on a line 210.

The provision of the latch 192 and the output pipeline latch sets 194, 196 enables valid picture data to be stored and read by the converter 12 even while the memory array 180 is in a write cycle. Should the system 12 desire to read during the write cycle, for example to carry out a time base error correction, the data held in the latch sets 194, 196 is available to the system. Thus, there is no time during which reading may not be commanded from the memory. If a read is commanded during the write operation, the data read is either early or late, but it is valid.

ARBITRATION

The 24-byte word is long enough to permit data manipulation over four complete memory cycles. These four cycles may be used either for write, for read, or for no activity whatsoever. The memory array (although structurally identical for the data acquisition memory 82 and the display scan conversion memory 124) is addressed differently, depending whether time base correction or display scan frequency doubling operations are being carried out. When time base error correction is being carried out in the data acquisition memory 82, only two memory cycles are needed, one to write data into the array and one to read data from the array. However, since the timing of the write addresses is not synchronized with the timing of the read addresses, a write/read overlap exists. The write operation must dominate since data must be written or is otherwise lost forever. The logic detects a write/read conflict and delays the read cycle until writing is finished. This delay is known as "early and late read". While the information read out remains exactly the same as earlier written, the read timing is early or late. This discrepancy is corrected for in the read latches. The overall write/read operation therefore requires a minimum of two or a maximum of three of the four available memory cycles. This memory readout timing arrangement provides for a margin of one extra memory cycle.

In the scan frequency conversion process carried out by the scan conversion memory 124, the incoming data has already been stabilized (time base corrected) by operation of the memory 82. Thus, there is no read/- write overlap to be concerned with. The four memory cycles are therefore available for the following operations:

1. read a word of video data and store it in a latch (phase 1);
2. read another word of video data and store it in a latch (phase 2);
3. write a new word of data from the acquisition memory 82 (phase 3). All three phases are accomplished within the time allocated to manipulation of one wide (24*8 bit) word with again a margin of one memory cycle remaining. It is apparent from this discussion of the available time intervals that the scan conversion memory 124 may actually triple the incoming data rate. This three-times scan conversion would require close attention to the tolerances of the particular components selected for implementation of the memory 124 and its related control logic.

SYSTEM TIMING (FIGS. 4A AND 4B)

Figure 4A:
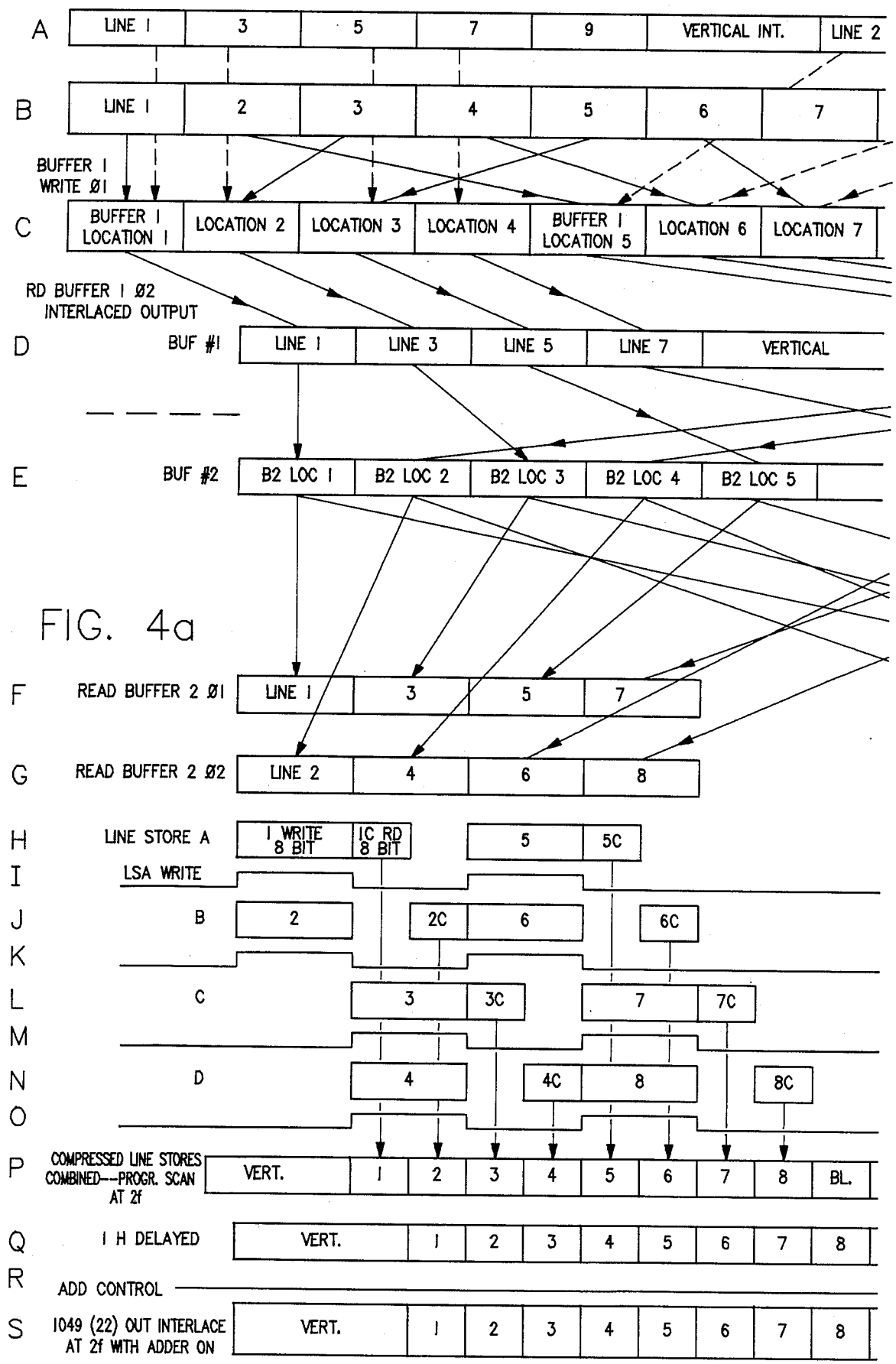
FIGS. 4A and 4B, when arranged together as shown in FIG. 4, provide a graph illustrating the operation of the FIG. 3 frame memory portion of the data acquisition and display scan converter of the present invention.
Figure 4B:
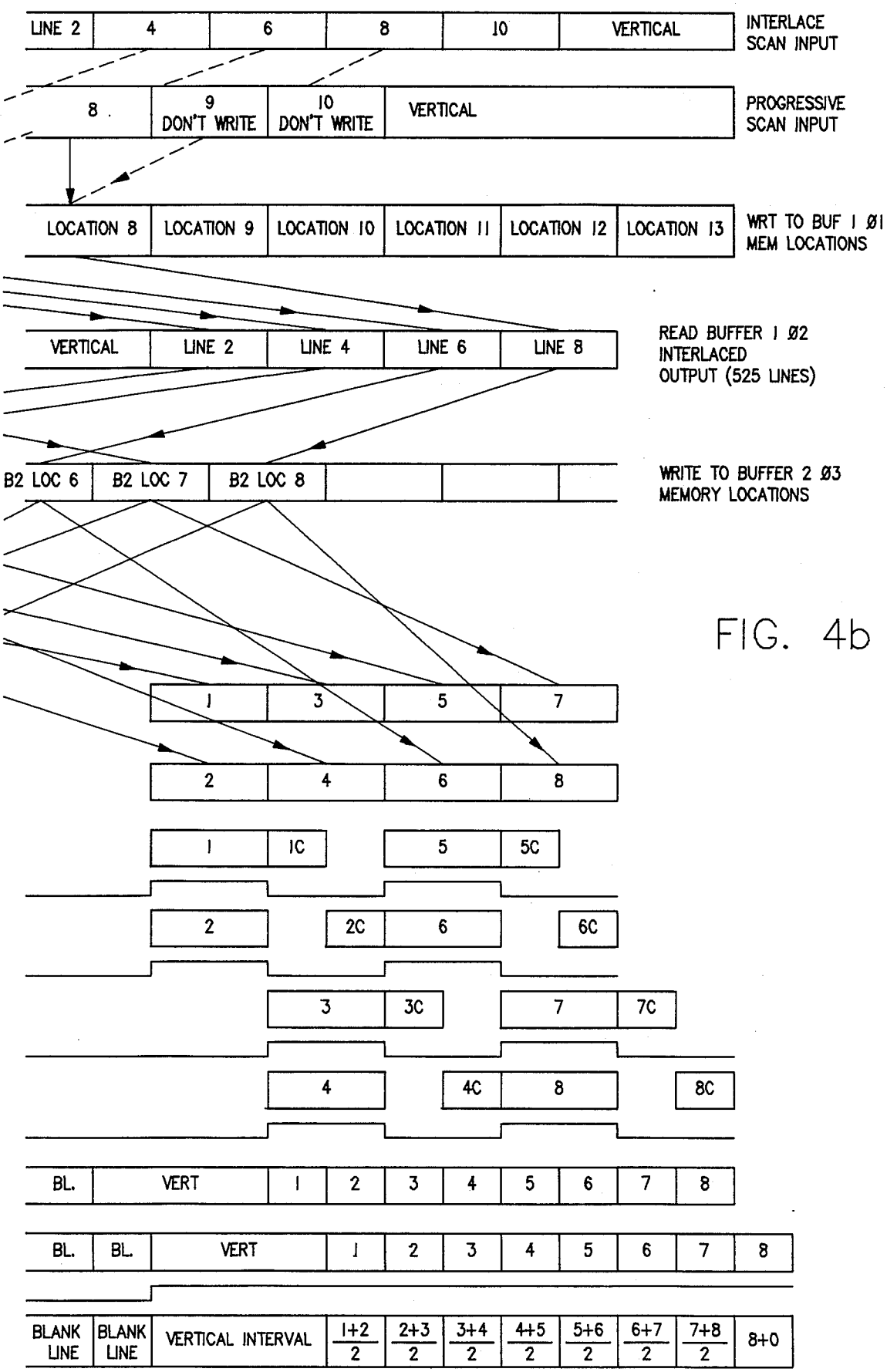

The timing diagram of FIGS. 4A and 4B is symbolic of the operation of the converter 12. To facilitate understanding the diagram depicts a simplified picture format. The top row A of the figure depicts a field of merely four lines followed by a vertical interval. A second field comprising four additional lines follow the vertical interval and are interlaced (i.e. interleaved on the display screen) with the lines of the first field. Thus, the top row A symbolizes conventional interlaced picture scan.

The next row B of the figure depicts a progressive (also called "sequential") scan wherein all eight lines are progressively scanned in sequence between each vertical retrace interval.

The third row C symbolizes buffer location addresses in the data acquisition buffer 82. The switchable address counters 68, 70 assign particular picture lines to particular buffer locations within the memory array 82. In the case of input of conventional interlaced scan (row A), the interlace address counter 70 loads line 1 to buffer location 1, line 3 to buffer locations 2, line 5 to buffer location 3, and line 7 to buffer location 4. Then, line 2 of the next field is written to buffer location 5, line 4 to buffer location 6, line 6 to buffer location 7 and line 8 to buffer location 8.

In the case of input of progressively scanned video (row B), the progressive counter 68 writes line 1 to buffer location 1, line 2 to buffer location 5, line 3 to buffer location 2, line 4 to buffer location 6, line 5 to buffer location 3, line 6 to buffer location 7, line 7 to buffer location 4, and line 8 to buffer location 8.

Row D of FIGS. 4A and 4B depicts an in-line readout of buffer locations 1 through 8 which provides a conventional interlaced scan output. This is the readout format followed by the data acquisition buffer memory 82.

The conventional interlaced picture data put out from the data acquisition buffer memory 82 via the line 86 is loaded into locations of the scan conversion memory 124 as depicted in row E of FIGS. 4A and 4B. Thus, line 1 is written to location 1, line 3 to location 3, line 5 to location 5, line 2 to location 2, line 4 to location 4, line 6 to location 6, and line 8 to location 8.

Scan conversion readout of the scan conversion memory 124 is more easily understood by considering rows F through S of FIGS. 4A and 4B together which spreads the scan conversion operations of the memory 124 along a common time base. As depicted in rows F and G, lines 1 and 2 are read from the memory 124, line 1 during phase 1 and line 2 during phase 2; and, line 1 is stored in line store 140A, while line 2 is stored in line store 140B, as shown by rows H, I, J and K. During the next time interval, lines 3 and 4 are read from the memory 124 (rows F and G) during phases 1 and 2 respectively of a memory cycle, and line 3 is stored in line store 140C while line 4 is stored in line store 140D (rows L, M, N and O). During the same memory cycle that lines 3 and 4 are being stored in line stores 140C and 140D, line 1 is being read out (row H) at twice the write rate thereby requiring only the first one half of the interval, and line 2 is then read out (row J) at twice the write rate over the second half of the interval. The same read/write sequences follow for lines 3-4, 5-6, 7-8.

The result, shown in row P, is an interlaced scan readout of video at twice the incoming rate. Each line is put out twice by the scan converter in the same time interval that each line entered the converter. One line is removed from every even field, so that the result is an interlaced display of picture information at twice the scan rate and with twice the number of horizontal scanning lines as came into the converter 12. This 2X scan rate, high vertical resolution signal may be delivered directly to the display device 50, or a "pseudo interlace" operation may be performed which maintains the high resolution while reducing the flicker rate.

In order to achieve a pseudo interlace, the one line delay 146 delays each line by one line period at the 2X scan rate, as shown by row Q of FIGS. 4A and 4B. For the first field, left half of row S, the adder 148 is disabled, and the output is the same as the delayed output. However, for the second field, shown as the right half of row S, the adder 148 is enabled, and it adds (averages) adjacent undelayed lines with delayed lines, rows P, Q and S, right side, to create lines which are averages of adjacent lines. These averaged lines are then interlaced as even fields and put out as a high resolution picture signal to the display device. Operation of the adder (row R) is controlled by a manual setting of the switch 152.

To those skilled in the art many changes in construction and widely varying embodiments will be suggested by the foregoing description of a preferred embodiment without departure from the spirit or scope of the present invention. The disclosures herein are purely illustrative and are not intended to be in any sense limiting.

We claim:

1. A video digital data acquisition and display scan converter for use with conventional video recorder means having an interlaced line scan input and output, analog television camera means for scanning frames of pictorial images at a first predetermined scanning rate, and analog display means for displaying said pictorial images at a second predetermined scanning rate selectively and integrally related to said first rate, said converter comprising:

an input for receiving an analog video data stream at a first line scan rate in one of interlaced and progressive scan format, analog to digital converter means connected to said input for receiving said analog video data stream from a selected one of said camera means in progressive scan format and said conventional video recorder means in interlaced scan format, said analog to digital converter means for converting scanned analog picture values of said data stream into digital words, first frame memory means connected to said analog to digital converter means for storing said digital words and having a first output connected to first digital to analog converter means for putting out said digital words stored in said first frame memory means in interlaced scan format, second frame memory means connected for receiving and storing said digital words put out by said first frame memory means at said first output and having a second output connected to second digital to analog converter means for putting out said digital words stored in said second frame memory means at said second line scan rate, first and second frame memory control means connected to said first frame memory means and to said second frame memory means for controlling the locations at which said digital words are written in said first and second frame memory means and for controlling the locations at which said digital words are read out from said first and second frame memory means and the rate at which said digital words are read out from said second frame memory means, and synchronizer means connected to said camera means and to said first and second frame memory control means for synchronizing camera scan rates and memory operations and for providing suitable synchronizing pulses to the analog video lines put out by said first and second digital to analog converter means.

2. The video digital data acquisition and display scan converter set forth in claim 1 wherein the pictorial images are progressively scanned by said camera means and are produced in response to pulsating energy excitation, and wherein said synchronizer means controls the timing of the excitation energy pulses.

3. The video digital data acquisition and display scan converter set forth in claim 1 wherein said first and second frame memory control means includes scan format selection means for selecting between progressive and interlaced scanning present at said input 4. The video digital data acquisition and display scan converter set forth in claim 1 further comprising averaging means connected to said second output for creating a pseudointerlace field for each frame stored in the second memory by calculating average picture values of picture elements of adjacent lines of the frame and putting out said average picture values as lines of a second field interlaced between the secquentially stored lines of the stored frame.

5. The video digital data acquisition and display scan converter set forth in claim 15 wherein said averaging means comprises a one scan line delay means for delaying the signal from the second output by a single scan line period and a summing junction receiving an undelayed input directly from the second output and a delayed input from the one scan line delay means.

6. The video digital data acquisition and display scan converter set forth in claim 2 wherein the pulsating energy excitation is provided by a pulsed X-ray tube the pulsing of which is timed by said synchronizer means, and wherein said camera means senses a pictorial image generated upon a screen of image intensifier means by pulsed X-ray excitation from said X-ray tube.

7. The video digital data acquisition and display scan converter set forth in claim 1 wherein said first and second frame memory means store integral multiple frames of video information which are selectably provided to said first and second frame memory means.

8. A video digital radiographic data acquisition and display scan converter including analog television camera means for progressively scanning frames at a predetermined line and frame scan rate of radiographic pictorial images excited by a pulsed energy source, and analog display means for displaying said radiographic pictorial images, said converter comprising:

clocked analog to digital converter means connected to receive an analog data stream from said camera means, said analog to digital converter means for converting picture elements of sequentially scanned lines of analog picture values into digital words, first frame memory means connected to said analog to digital converter means for storing digitized picture words comprising at least one frame of video radiogrphic information scanned by said camera means and having a first output including first digital to analog converter means for putting out said picture words in conventional interlaced scan format at said predetermined frame rate, second frame memory means connected for receiving and storing said picture words put out by said first frame memory means at said first output and having a second output connected to second digital to analog converter means for putting out said picture words stored in said second frame memory means at a second line scan rate selectively and integrally related to said first line scan rate, first and second frame memory control means connected to said first and second frame memory means for controlling the locations at which said picture words are written in said first and second frame memory means and for controlling the locations at which said picture words are read out from said first and second frame memory means and the rate at which said picture words are read out from said second frame memory means, and Synchronizer means connected to said pulsed energy source, said camera means, said analog to digital converter means, said first and second frame memory control means and said digital to analog converter means, said synchronizer means for synchronizing energy pulses, camera scan rates and operations and for providing suitable synchronizing pulses to the analog video lines put out by said digital to analog converter means.

9. The video digital radiographic data acquisition and display scan converter set forth in claim 8 for supplying a conventional video recorder means for recording said picture words at standard interlaced scan rate and format at said predetermined frame rate put out by said first digital to analog converter means and having a interlaced video input for receiving interlaced video input at standard interlaced scan rate and format from the video recorder means.

10. The video digital radiographic data acquisition and display scan converter set forth in claim 8 providing a selectable plurality of analog outputs including an interlaced video output at the camera scan rate for input to a conventional video recorder means and an interlaced video output at said integral multiple of the scan rate.

11. The video digital radiographic data acquisition and display scan converter set forth in claim 8 wherein said first and second frame memory means store integral multiple frames of video radiographic information which are selectably provided to said first and second memory means.

12. A method for acquiring and storing video picture frames at a first rate and for reading and displaying said frames at a second rate which is a selectable integral of said first rate, said method including the steps of:

converting analog picture elements to digital words, storing at least one frame of digital words in a first memory at the first rate, reading said frame of digital words out of the first memory at the first rate in interlaced scan format, storing the frame of digital words read out of the first memory in a second memory at the first rate, reading said frame of digital words out of the second memory at a second rate which is a selectable integral multiple of the first rate, converting the digital words read out of the first memory to analog picture values and putting out said converted analog picture values in interlaced scan format, converting the digital words read out of the second memory to analog picture values and putting out said converted analog picture values at the second rate.

13. The method set forth in claim 12 wherein the frame of digital words is sequentially stored in the first memory and wherein the frame is read from the first memory in interlace format.

14. The method set forth in claim 13 further comprising the step of creating a pseudointerlace field for each frame stored in the second memory by calculating average picture values of picture elements of adjacent lines of the frame and putting out said average picture values as lines of a second field interlaced between the secquentially stored lines of the stored frame.

* * * * *